(12) United States Patent
Asami

(10) Patent No.: US 7,322,767 B2
(45) Date of Patent: Jan. 29, 2008

(54) WATER-BASED INK COMPOSITION FOR BALLPOINT PEN AND WATER-BASED BALLPOINT PEN

(75) Inventor: Hideaki Asami, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 485 days.

(21) Appl. No.: 11/086,428

(22) Filed: Mar. 23, 2005

(65) Prior Publication Data
US 2005/0214062 A1    Sep. 29, 2005

(30) Foreign Application Priority Data
Mar. 23, 2004 (JP) ............. P.2004-085439
Mar. 23, 2004 (JP) ............. P.2004-085440

(51) Int. Cl.
*B05C 17/00* (2006.01)
*B43K 7/10* (2006.01)
*C09D 11/00* (2006.01)

(52) U.S. Cl. .............. 401/216; 401/208; 401/214; 106/31.68; 106/31.28

(58) Field of Classification Search .......... 401/208, 401/216, 217, 141, 142, 222, 214; 106/31.68, 106/31.86, 31.58, 31.28
See application file for complete search history.

(56) References Cited

U.S. PATENT DOCUMENTS

| 4,671,691 A | 6/1987 | Case et al. |
|---|---|---|
| 5,753,021 A | 5/1998 | Martin |
| 6,275,816 B1 | 8/2001 | Hattori et al. |
| 6,497,759 B1* | 12/2002 | Yoshimura et al. ...... 106/31.65 |
| 6,616,741 B1 | 9/2003 | Sawa et al. |

FOREIGN PATENT DOCUMENTS

| EP | 0587391 A2 | 3/1994 |
|---|---|---|
| EP | 1006162 A1 | 6/2000 |
| JP | 59-74175 A | 4/1984 |
| JP | 06-256700 A | 9/1994 |

\* cited by examiner

*Primary Examiner*—David J. Walczak
(74) *Attorney, Agent, or Firm*—Sughrue Mion, PLLC

(57) ABSTRACT

A water-based ink composition for ballpoint pen which has a colorant, water, a water soluble organic solvent and, as a shear-thinning tackifier, a polysaccharide, wherein the polysaccharide exists in the ink as particles having an average particle size less than 5 μm, and a water-based ballpoint pen using the composition.

16 Claims, 3 Drawing Sheets

WATER-BASED INK COMPOSITION FOR BALLPOINT PEN AND WATER-BASED BALLPOINT PEN

The present invention claims foreign priority to Japanese patent applications no. P.2004-85439, filed on Mar. 23, 2004, P.2004-85440, filed on Mar. 23, 2004, the contents of which are incorporated herein by reference.

BACKGROUND OF THE INVENTION

1. Field of the Invention

The present invention relates to a water-based ink composition for ballpoint pen and a water-based ballpoint pen using the composition. More specifically, the present invention pertains to a water-based ink composition for ballpoint pen which overcomes the problems such as blur and failure in writing owing to the clogging at the writing tip portion and pertains to a water-based ballpoint pen using the composition.

2. Description of the Related Art

A large number of water-based ballpoint pens having a water-based ink for ballpoint pen directly filled in an ink reservoir tube and equipped with an ink follower at the rear portion of the ink have been put on the market.

The ink composition to be filled in the ballpoint pen contains a shear-thinning tackifier so that the ink composition exhibits a high viscosity and is retained stably in a ballpoint pen mechanism when it is allowed to stand without a shear stress, while by a shear stress caused by the rotation of the ball upon writing, the ink composition has a reduced viscosity in the vicinity of the ball and is therefore transferred onto a paper surface.

Although an ink composition having a polysaccharide as the shear-thinning tackifier is conventionally disclosed, the polysaccharide, when it exists in the ink, has a particle size of about 10 μm or greater and even if it has a relatively small particle size, it exceeds 5 μm.

Ballpoint pens filled with the above-described conventional ink composition therefore do not always show a satisfactorily smooth flow. When such an ink composition is filled in a ballpoint pen equipped with a ballpoint pen tip holding a small-diameter ball and having a narrow clearance between the ball and the ball receiver portion and this ballpoint pen is put into practical use, the shear-thinning tackifier tends to cause clogging in the ballpoint pen tip and damage the smooth ink discharge, which sometimes leads to deterioration in writing performance such as blur or failure in writing (refer to, for example, Japanese Patent Unexamined Publication No. JP-A-59-74175).

SUMMARY OF THE INVENTION

An object of the invention is to overcome the above-described problem, that is, to provide a water-based ballpoint pen showing a smooth ink discharge continuously and excellent in writing performance.

According to a first aspect of the present invention, there is provided a water-based ink composition for a ballpoint pen, comprising:
  a colorant;
  water;
  a water soluble organic solvent; and
  a shear-thinning tackifier including at least a polysaccharide,
  wherein an average particle size of the polysaccharide is less than 5 μm.

According to a second aspect as set forth in the first aspect of the present invention, it is preferable that the average particle size of the polysaccharide is less than 3 μm.

According to a third aspect as set forth in the first aspect of the present invention, it is more preferable that the polysaccharide is xanthan gum or succinoglycan.

According to a fourth aspect as set forth in the first aspect of the present invention, there is provided a water-based ballpoint pen, comprising:
  the water-based ink composition according to the first aspect of the present invention;
  a ball;
  a ballpoint pen tip having a ball holding portion which holds the ball rotatably at an apex thereof;
  an ink reservoir tube connected directly or via a connecting member to the ball point pen tip, the ink reservoir tube including:
    a ballpoint pen refill directly filled with the ink; and
    a barrel accommodating the ballpoint pen refill therein,
  wherein a movable distance of the ball in the ball holding portion in an axial direction is 3 μm or more and 15 μm or less.

According to a fifth aspect as set forth in the first aspect of the present invention, there is provided a water-based ballpoint pen, comprising:
  the water-based ink composition, according to first aspect of the present invention, filled in the ballpoint pen;
  a ball;
  a ballpoint pen tip having a ball holding portion which holds the ball rotatably at an apex thereof; and
  an barrel connected directly or via a connecting member to the ball point pen tip,
  wherein a movable distance of the ball in the ball holding portion in an axial direction is 3 μm or more and 15 μm or less.

According to a sixth aspect as set forth in the fourth aspect of the present invention, it is preferable that the water based ballpoint pen further comprising a cap.

According to a seventh aspect as set forth in the first aspect of the present invention, there is provided a cap-less type water-based ballpoint pen, comprising:
  the water-based ink composition according to the first aspect of the present invention;
  a ball;
  a ballpoint pen tip holding the ball rotatably at an apex thereof;
  an ink reservoir tube connected directly or via a relay member to the ball point pen tip, the ink reservoir tube including;
    a ballpoint pen refill directly filled with the water-based ink composition;
    a barrel accommodating the ballpoint pen refill therein; and
    a retractable mechanism which actuates a writing tip portion of the ballpoint pen refill to protrude or retract from a front-end opening portion of the barrel.

According to an eighth aspect as set forth in the fourth aspect of the present invention, it is preferable that the ballpoint pen tip is formed such that a ball receiving seat is formed by pressing and deforming a vicinity of an end of a metal pipe inwardly from an outer surface thereof.

According to a ninth aspect as set forth in the fourth aspect of the present invention, it is more preferable that a diameter of the ball is 0.1 mm or more and less than 0.3 mm.

According to a tenth aspect as set forth in the fourth aspect of the present invention, it is further preferable that an ink follower is disposed at a rear end surface of the water-based ink composition.

According to an eleventh aspect as set forth in the first aspect of the present invention, it is further more preferable that the water-based ink composition further comprising at least one of humectants, pH regulator, rust preventive agent, antiseptic agent, mildew proofing agent, lubricant and defoaming agent.

According to a twelfth aspect as set forth in the first aspect of the present invention, it is further suitable that the average particle size of the polysaccharide is less than 1 μm.

According to a thirteenth aspect as set forth in the fourth aspect of the present invention, it is further more suitable that a movable distance of the ball in the ball holding portion in the axial direction is 3 μm or more and 13 μm or less.

According to a fourteenth aspect as set forth in the fourth aspect of the present invention, it is desirable that a movable distance of the ball in the ball holding portion in the axial direction is 4 μm or more and 11 μm or less.

According to a fifteenth aspect as set forth in the fourth aspect of the present invention, it is more desirable that a movable distance of the ball in the ball holding portion in a radial direction is 3 μm or more and 20 μm or less.

According to a sixteenth aspect as set forth in the fourth aspect of the present invention, it is further desirable that the ball is made of one selected from hard metal, stainless steel, ruby, ceramic, resin and rubber.

The invention makes it possible to provide a water-based ink composition for ballpoint pen which shows smooth ink flow and permits writing of a fine-width line without causing blur or failure in writing; and a water-based allpoint pen using the composition.

DETAILED DESCRIPTION OF THE PREFERRED EMBODIMENTS

Figure 1:
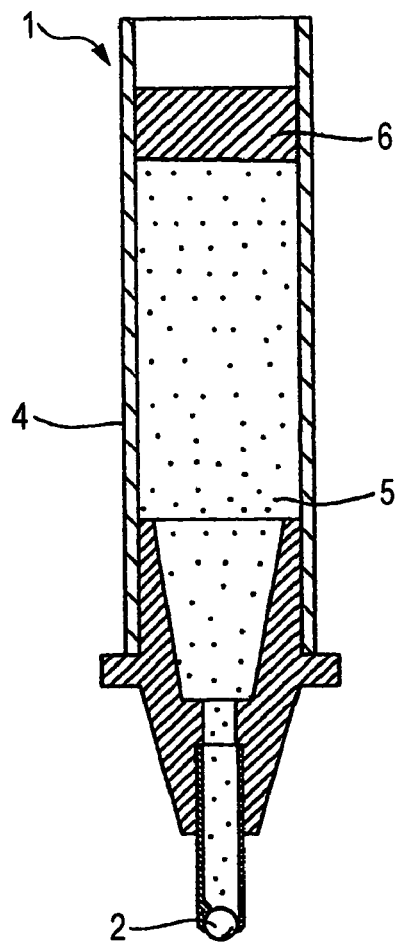
FIG. 1 is a schematic view of a ballpoint pen refill to be used for a water-based ballpoint pen.

The polysaccharide to be used in the invention exists in ink as particles having an average particle size less than 5 μm, preferably less than 3 μm, more preferably less than 1 μm. It can therefore easily pass through a clearance between a ball and a ball receiver portion and does not disturb the smooth ink flow, which contributes to the formation of good written lines.

Even if the particle size of the polysaccharide exceeds 3 μm, the ink composition containing it can be used for ballpoint pen tips whose ball has a movable distance, in an axis direction, of about 3 μm. Such a particle size therefore does not disturb the smooth ink flow.

Examples of the polysaccharide include xanthan gum, welan gum, succinoglycan (having an average molecular weight of from about 100 to 8,000,000) which is an organic-acid-modified heteropolysaccharide having, as a constituent monosaccharide, glucose and galactose, guar gum, locust bean gum and derivatives thereof, λ-carrageenan, hydroxyethyl cellulose, alkyl arginates, polymers composed mainly of an alkyl ester of methacrylic acid and having a molecular weight of from 100,000 to 150,000, glucomannan, and polysaccharide thickeners extracted from seaweeds and having a gelling capacity such as agar and carrageenan. Of these, xanthan gum or succinoglycan whose average particle size can easily be reduced is preferred.

Specific examples of the xanthan gum include "KELZAN T", "KELZAN ST" and "KELZAN ASX" (each, trade name; product of Sansho Co., Ltd.), "ECHO GUM RD", "ECHO GUM BT" and "RHABALL GUM EX" (each, trade name; product of Dainippon Pharmaceutical Co., Ltd.), "Ultraxanthan V7-T" (trade name; product of Ina Food Industry Co., Ltd.), and "NEWGEKIN GXR" and "NEW GEKIN GXT" (each, trade name; product of Chuo Kasei Co., Ltd.).

As the colorant, any dyes and pigments soluble or dispersible in an aqueous medium can be used. Specific examples of them will next be described.

As acid dyes, usable are:
New Coccine (C.I. 16255),
Tartrazine (C.I. 19140),
Acid Blue Black 10B (C.I. 20470),
Guinea Green (C.I. 42085),
Brilliant Blue FCF (C.I. 42090),
Acid Violet 6BN (C.I. 43525),
Soluble Blue (C.I. 42755),
Naphthalene Green (C.I. 44025),
Eosine (C.I. 45380),
Phloxine (C.I. 45410),
Erythrosin (C.I. 45430),
Nigrosine (C.I. 50420), and
Acid Flavin (C.I. 56205).

As basic dyes, usable are:
Chrysoidine (C.I. 11270),
Methyl Violet FN(C.I. 42535),
Crystal Violet (C.I. 42555),
Malachite Green (C.I. 42000),
Victoria Blue FB (C.I. 44045),
Rhodamine B (C.I. 45170),
Acridine Orange NS(C.I. 46005), and
Methylene Blue B (C.I. 52015).

As direct dyes, usable are:
Congo Red (C.I. 22120),
Direct Sky Blue 5B (C.I. 24400),
Violet BB (C.I. 27905),
Direct Deep Black EX (C.I. 30235),
Kayarus Black G Conc (C.I. 35225),
Direct Fast Black G (C.I. 35255), and
Phthalocyanine Blue (C.I. 74180)

When dyes are used as the colorant, eminent dry-up occurs in a system to be applied to a knock-type cap-less ballpoint pen so that dry-up resistance becomes an important factor for the dyes.

As the pigment, usable are inorganic pigments such as carbon black and ultramarine, organic pigments such as copper phthalocyanine blue and benzidine yellow, and aqueous pigment dispersions prepared in advance by finely and stably dispersing a pigment in an aqueous medium with an aid of a surfactant or resin. Specific examples include:

C.I. Pigment Blue 15:3B (trade name: "Sandye Super Blue GLL", product of Sanyo Color Works, Ltd., having a pigment content of 24%), C.I. Pigment Red 146 (trade name: "Sandye Super Pink FBL", product of Sanyo Color Works, Ltd., having a pigment content of 21.5%), C.I. Pigment Yellow 81 (trade name: "TC Yellow FG", product of Dainichiseika Color & Chemicals Mfg. Co., Ltd, having a pigment content of about 30%), and C.I. Pigment Red 220/166 (trade name: "TC Red FG", product of Dainichiseika Color & Chemicals Mfg. Co., Ltd, having a pigment content of about 35%).

Examples of the aqueous pigment dispersion using a water soluble resin include:

C.I. Pigment Black 7 (trade name: "WA Color Black A25", product of Dainichiseika Color & Chemicals Mfg. Co., Ltd, having a pigment content of 15%), C.I. Pigment Green 7 (trade name: "WA-S Color Green", product of Dainichiseika Color & Chemicals Mfg. Co., Ltd, having a pigment content of 8%), C.I. Pigment Violet 23 (trade name: "Micropigmo WMVT-5", product of Orient Chemical Industries, Ltd., having a pigment content of 20%), and C.I. Pigment Yellow 83 (trade name: "Emacol NS Yellow 4618", product of Sanyo Color Works, Ltd., having a pigment content of 30%).

As a fluorescent pigment, fluorescent pigments in the synthetic resin fine particulate form obtained by forming a solid solution of a fluorescent dye in a resin matrix can be used. Additional examples include metalescent pigments, light storing pigments, white pigments such as titanium dioxide, silica and calcium carbonate, capsule pigments having a reversible thermochromic composition encapsulated therein, perfumes and capsule pigments having a perfume encapsulated therein.

Examples of the metalescent pigment include metal powders such as aluminum and brass powder; pearl pigments prepared by covering, with a metal oxide such as titanium oxide, the surface of a core substance such as natural mica, synthetic mica, glass piece, alumina or transparent film piece with a metal oxide such as titanium dioxide; fine pieces obtained by cutting a metalescent film piece having a transparent or colored transparent film on one side or both sides of a metal-deposited film; and finely cut pieces of an iris-like film obtained by stacking a plurality of transparent resin layers one after another.

When metal powder such as aluminum or brass powder is used, the metal powder having a surface covered with a transparent resin or a colored transparent resin is preferred. It is excellent in stability in the ink composition.

When a pigment is used as the colorant, a pigment dispersant can be added as needed.

Examples of the pigment dispersant include surfactants such as anionic surfactants and nonionic surfactants, anionic polymers such as polyacrylic acid and styrene-acrylic acid and nonionic polymers such as PVP and PVA.

Examples of the water soluble organic solvent include ethanol, propanol, butanol, glycerin, sorbitol, triethanolamine, diethanolamine, monoethanolamine, ethylene glycol, diethylene glycol, thiodiethylene glycol, hexylene glycol, 1,3-butanediol, neoprene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, ethylene glycol monomethyl ether acetate, sulfolane, 2-pyrrolidone, and N-methyl-2-pyrrolidone.

These water soluble organic solvents may be used either singly or in combination.

As well as the above-described components, one or more water-soluble resins such as alkyd resin, acrylic resin, styrene-maleic acid copolymer, cellulose derivative, polyvinylpyrrolidone, polyvinyl alcohol and dextrin may also be added to the resin; or one or more humectants such as urea, nonionic surfactants, sorbitol, mannitol, sucrose, glucose, hydrogenated starch hydrolysate and sodium pyrophosphate may also be added, within an extent not interfering with the drying resistance of the ink composition.

If desired, a pH regulator, rust preventive, antiseptic or mildew proofing agent, and lubricant can be added.

Examples of the pH regulator include inorganic acid salts such as sodium carbonate, sodium phosphate, sodium hydroxide, and sodium acetate and organic basic compounds such as water-soluble amine compounds, for example, triethanolamine and diethanolamine.

Examples of the rust preventive include benzotriazole and derivatives thereof, tolyltriazole, dicyclohexyl ammonium nitrite, diisopropyl ammonium nitrite, sodium thiosulfate, ethylenediaminetetraacetates, saponin, and dialkylthiourea.

Examples of the antiseptic or mildew proofing agent include carbolic acid, sodium salts of 1,2-benzisothiazolin-3-one, sodium benzoate, sodium dehydroacetate, potassium sorbate, propyl paraoxybenzoate, 2,3,5,6-tetrachloro-4-(methylsulfonyl)pyridine.

Examples of the lubricant include metal soaps, polyalkylene glycol fatty acid esters, ethylene oxide-added cationic activators, phosphate-type activators, thiocarbamates, and dimethyldithiocarbamates.

In addition, a fluorine-containing surfactant as well as a nonionic, anionic or cationic surfactant for promoting solvent penetration, and a defoaming agent such as dimethylpolysiloxane may also be added to the ink composition.

In the case where the above-described ink composition is applied to a cap-less type water-based ballpoint pen in which the writing tip portion of a ballpoint pen refill is protruded or retracted from the front opening portion of a barrel, actuated by a retractable mechanism, it is preferred to add a viscosity-increasing inhibitor such as an oligomer of N-vinyl-2-pyrrolidone, N-vinyl-2-pyrrolidone or N-cyclohexyl-2-pyrrolidone in order to improve the writing smoothness both at the beginning of writing and after passage of time without causing blur of a written line even if a water content in the ink composition is lost by evaporation from the writing tip portion.

The above-described viscosity-increasing inhibitor may be added to the ink composition in an amount of from 5 to 40 wt. %, preferably from 5 to 25 wt. %, more preferably from 10 to 20 wt. %.

As the evaporation inhibitor, oligomers of N-vinyl-2-pyrrolidone are preferred, of which those having a polymerization degree (n) of from 2 to 20, preferably from 2 to 10, more preferably from 2 to 6 are employed.

In the case where the above-described ink composition is applied to a ballpoint pen of a type in which the ink composition is directly filled in an ink reservoir tube and an ink follower is disposed at the rear end surface of the ink composition, mixing of a gas in the ink composition has an adverse effect on the ink flow upon writing, because gases gather with the passage of time and they generate air bubbles. Existence of these air bubbles at the writing tip portion may presumable cause a failure in writing. It is therefore preferred to remove air bubbles chemically by adding ascorbic acid, derivatives thereof, α-tocopherol, catechin, derivatives thereof, synthetic polyphenol, kojic acid, alkylhydroxylamines, oxime derivaties, α-glucosylrutin, phosphonates, phosphinates, sulfites, sulfoxylates, dithionites, thiosulfates, thiourea dioxide, formamidine sulfinic acid and glutathione.

Particles contained in the ink composition other than the shear-thinning tackifier preferably exist in the ink composition as those having a particle size less than 5 μm, preferably less than 3 μm, more preferably 1 μm from the standpoint of smooth ink flow.

The above-described ink composition is filled in a ballpoint pen equipped, at the writing tip portion thereof, a ballpoint pen tip.

The structure of a ballpoint pen will next be described (refer to FIGS. 1 to 6).

Although no particular limitation is imposed on the structure or shape of a ballpoint pen itself, the ballpoint pen of the invention has, housed in a barrel thereof, a ballpoint pen refill 1 which has an ink reservoir tube 4 filled with an ink composition 5. The ink reservoir tube 4 is communicated with a ballpoint pen tip which holds a ball 2 in the end portion thereof. An ink follower composition 6 is in close contact with the end surface of the ink composition 5.

The ballpoint pen may have another structure in which it has a barrel filled with the ink composition; the barrel is communicated with a ballpoint pen tip which holds a ball in the end portion of the barrel; and an ink follower composition is in close contact with the end surface of the ink composition.

The ballpoint pen having the above-described structure preferably has a cap.

The ballpoint pen may be a cap-less ballpoint pen having a structure in which a writing tip portion (ballpoint pen tip) of a ballpoint pen refill is housed in a barrel while being exposed to the air and the writing tip portion protrudes from the opening portion of the barrel, actuated by a retractable mechanism.

Examples of the operation method of the retractable mechanism include knock type, rotation type and slide type.

The knock type has, for example, a knocking portion at the rear end portion or side surface portion of a barrel and the writing tip portion of a ballpoint pen refill is protruded or retracted by pushing the knocking portion or by pushing the clip portion disposed at the barrel.

The rotation type has, for example, a rotating portion at the rear portion of a barrel and by turning the rotating portion, the writing tip portion of a ballpoint pen refill can be protruded or retracted from the front-end opening portion of the barrel.

The slide type has, for example, a slide portion on the side surface of a barrel and by operating this slide, the writing tip portion of a ballpoint pen refill can be protruded or retracted from the front opening portion of the barrel. Alternatively, the writing tip portion of the ballpoint pen refill can be protruded or retracted from the front end opening portion of the barrel by sliding the clip portion disposed at the barrel.

Conventionally used general-purpose mechanism is effective as the structure of a ballpoint pen tip. Examples of the mechanism include a mechanism (refer to FIGS. 2 and 3) in which a metal pipe in the vicinity of its end is deformed inward from the outer surface under pressure, a ball receiver 3 is caused to hold a ball 2 therein, and a tip end portion equipped with a center hole 31, an ink outlet hole 32 and a ball receiving seat 33 is formed integrally; a mechanism (refer to FIGS. 4 and 5) in which a tip portion is formed by cutting of a metal material by a drill, a ball receiver 3 is caused to hold a ball 2 therein, and a center hole 31, a radial ink outlet hole 32 and a ball receiving seat 33 are disposed; a mechanism (refer to FIG. 6) in which a ball is biased forward by a spring; and a mechanism in which a ball receiving seat made of a resin is disposed inside of a tip made of a metal or plastic.

The ballpoint pen tip will next be descried more specifically. A ballpoint pen tip capable of satisfying a movable distance (A), in the axial direction, within a range of from 3 to 15 μm, preferably from 3 to 13 μm, more preferably from 4 to 11 μm is used.

When the movable distance, in the axial direction, of the ball relative to the outer diameter of the ball is outside the above-described range, it is difficult to appropriately control the discharged amount of the ink composition to be used in the invention. In such a case, a blur of a drawn line occurs, or owing to the discharge of the ink in an amount exceeding the necessary amount, an excess ink is left on the surface of a writing paper or the like, which makes it difficult to form good writing.

Figure 2:
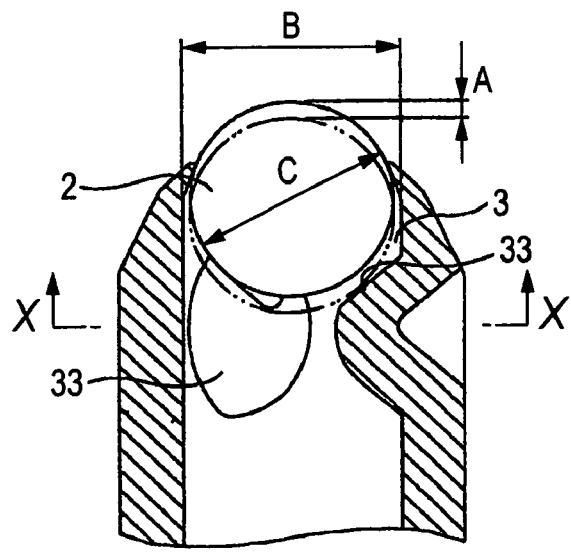
FIG. 2 is a longitudinal cross-sectional schematic view of a ballpoint pen tip of the ballpoint pen refill of FIG. 1.
Figure 3:
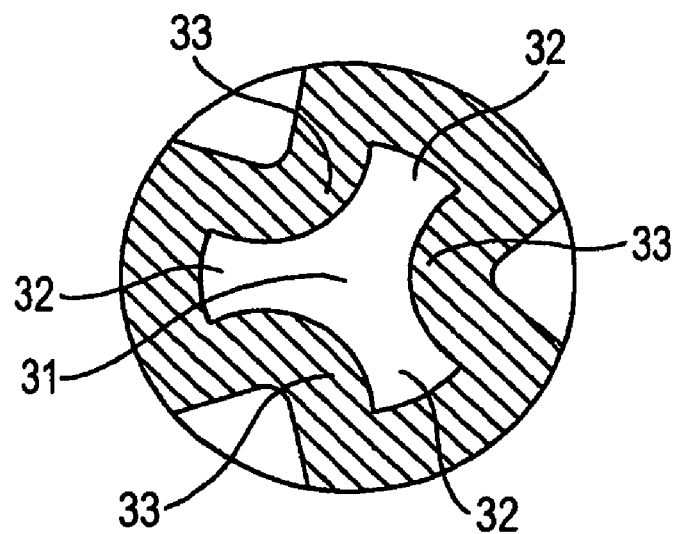
FIG. 3 is a cross-sectional view of the ballpoint pen tip taken along a line X-X of FIG. 2.
Figure 4:
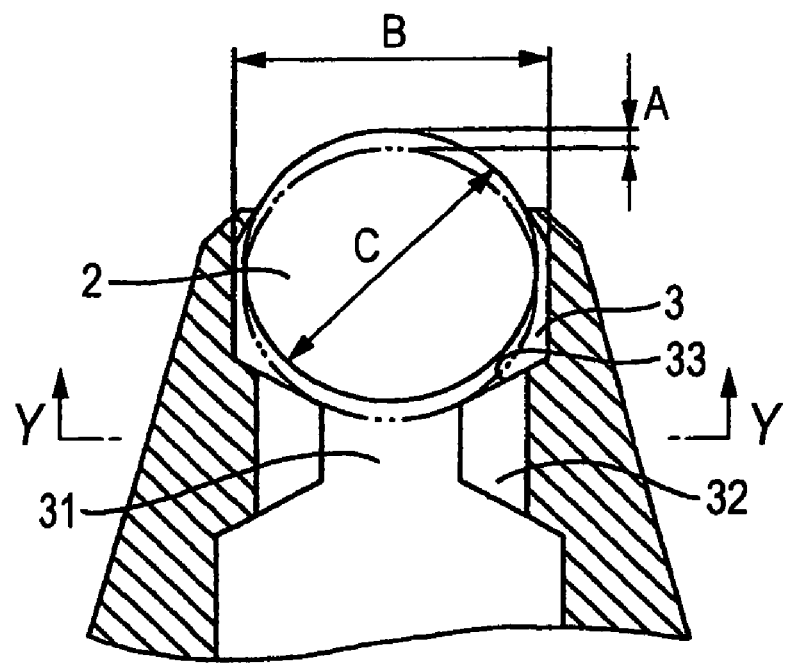
FIG. 4 is a longitudinal cross-sectional schematic view of another example of a ballpoint pen tip of a water-based ballpoint pen.
Figure 5:
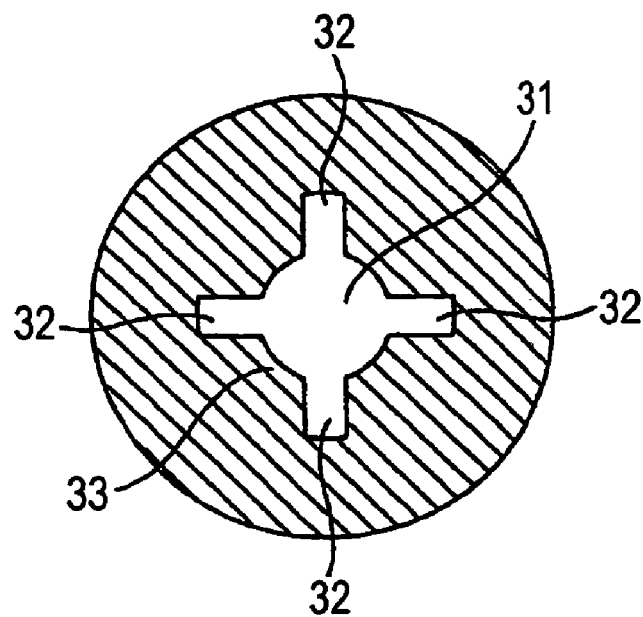
FIG. 5 is a cross-sectional view of the ballpoint pen tip taken along a line Y-Y of FIG. 4.
Figure 6:
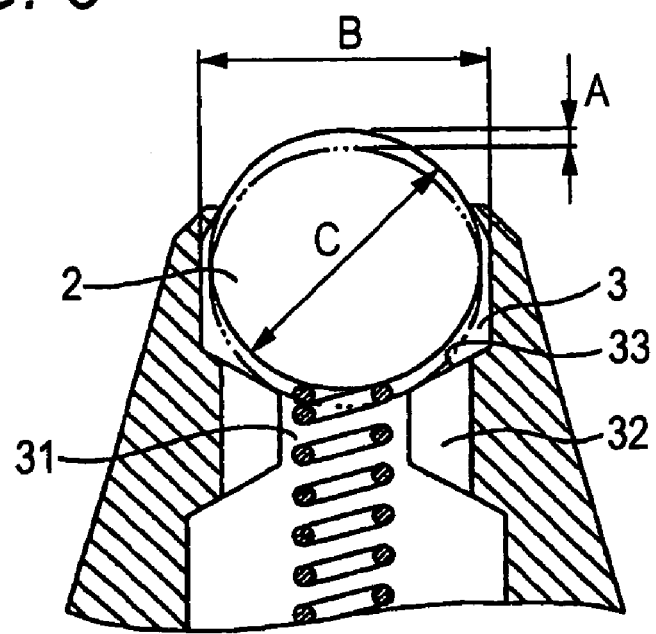
FIG. 6 is a longitudinal cross-sectional schematic view of a further example of a ballpoint pen tip of a water-based ballpoint pen.

The movable distance (B-C as shown in FIG. 2) in the diameter direction is preferably from 3 to 20 μm.

An hard metal, stainless steel, ruby, ceramic, resin, rubber or the like is suited as a material of the ball. The ball having a diameter of from 0.1 to 3.0 mm can be used. The diameter is preferably from 0.15 to 0.4 mm, more preferably from 0.2 to 0.3 mm.

As the ink reservoir or barrel for housing the ink composition therein, a molded or formed product made of a thermoplastic resin such as polyethylene, polypropylene, polyethylene terephthalate or nylon is used.

By using a transparent, colored transparent, or semi-transparent molded or formed product as the ink reservoir or barrel, it is possible to confirm the color or remaining amount of the ink.

In the rear end of the ink composition, an ink follower can be filled.

The ink follower composition is composed of a nonvolatile liquid or hardly volatile liquid.

Specific examples include petrolatum, spindle oil, castor oil, olive oil, refined mineral oil, liquid paraffin, polybutene, α-olefin, oligomer or co-oligomer of α-olefin, dimethyl silicone oil, methyl phenyl silicone oil, amino-modified silicone oil, polyether-modified silicone oil and fatty-acid-modified silicone oil. They may be used either singly or in combination.

It is preferred to add a gelling agent to the above-described non-volatile liquid and/or hardly volatile liquid in order to increase its viscosity to a desired level. Examples of the gelling agent include clay type thickener such as silica having a surface subjected to hydrophobic treatment, fine particle silica having a methylated surface, aluminum silicate, expandable mica, and bentonite or montmorillonite subjected to hydrophobic treatment; fatty acid metal soaps such as magnesium stearate, calcium stearate, aluminum stearate and zinc stearate; tribenzylidene sorbitol, fatty acid amides, amide-modified polyethylene wax, hydrogenated castor oil, dextrin compounds such as fatty acid dextrin and cellulose compounds.

The ink follower composition in the liquid form can also be used in combination with an ink follower in the solid form.

EXAMPLES

Filterability Test of Shear-Thinning Tackifier through a Membrane Filter

Testing Method

A 0.5% aqueous solution of a polysaccharide (99.5% of water is mixed with 0.5% of the polysaccharide in a dispersion mill at 2000 rpm for 30 minutes and then 50 g of the mixture is weighed) as described in the below table 1 is filtered trough a 5 μm or 1 μm membrane filter (diameter: 4.7 cm).

The test results of filterability are shown in table 1.

The test results are evaluated in accordance with the following criteria:

A: The filtration of the solution is completed within one minute.

B: It takes more time to complete the filtration because of slight clogging, though the solution can be filtered.

C: Filtration cannot be completed and clogging occurs.

It has been understood from the test results that the particle size differs, depending on the kind of the polysaccharide.

Examples will next be described, but the present invention is not limited to or by them. In tables 2 and 3, the composition of each of water-based inks for ballpoint pen in Examples and Comparative Examples will be indicated.

Numerals of the composition in these tables are parts by weight.

Raw materials in the tables 2 and 3 will next be described in numerical order.
(1) "Water Black 100L" (trade name; product of Orient Chemical Industry, effective ingredient: 20%)
(2) C.I. 45410 ("Floxin", trade name; product of Aizen Hodogaya Co., Ltd.)
(3) C.I. 42655 ("Acid Blue PG", trade name; product of Sumitomo Chemical Co., Ltd.)
(4) A pigment dispersion obtained by mixing, in a beads mill, 10 parts of carbon black (DBP oil absorption: 56), 15 parts of an N-pyrrolidone/1-butene copolymer and 75 parts of water.
(5) "Fuji SP Blue 625" (trade name; product of Fuji Color Works, composed of 27.5% of copper phthalocyanine blue, 8% of diethylene glycol and 4% of an anionic surfactant).
(6) "ECHO GUM BT" (trade name; product of Dainippon Pharmaceutical Co., Ltd.).
(7) "KELZAN ST" (trade name; product of Sansho Co., Ltd.)
(8) "NEWGELIN GXR" (trade name; product of Chuo Kasei Co., Ltd.).
(9) "ECHO GUM RD" (trade name; product of Dainippon Pharmaceutical Co., Ltd.).
(10) "RHABALL GUM EX" (trade name; product of Dainippon Pharmaceutical Co., Ltd.).
(11) 1,2-benzthiazolin-3-one ("Proxel XL-2", trade name; product of Avecia, Ltd.).
(12) Phosphoric ester type surfactant ("PLYSURF AL", trade name; product of Dai-ichi Kogyo Seiyaku Co., Ltd.).
(13) "KELZAN AR" (trade name; product of Sansho Co., Ltd.).
(14) "KlA96" (trade name; product of Sansho Co., Ltd.).
(15) "Alcasea gum" (trade name; product of Hakuto Chemical Co., Ltd.
(16) "ECHO GUM" (trade name; product of Dainippon Pharmaceutical Co., Ltd.)
(17) "ULTRAXANTHAN V7" (trade name; product of Ina Food Industry Co., Ltd.)

Preparation of Ink Follower

After the addition of 15 parts of a fatty acid amide as a thickener to 85 parts of polybutene serving as a base oil, the resulting mixture is kneaded by a three-roll mill, whereby an ink follower is prepared.

Manufacture of Water-Based Ballpoint Pen A

After each of the above-described ink compositions is filled in a ballpoint pen refill having, fitted at one end of a polypropylene pipe (inner diameter: 3.8 mm), a tip made of a stainless steel which holds therein a ball having a diameter of 0.5 mm and the above-described ink follower is disposed at the rear portion of the refill, the resulting ballpoint pen refill is inserted in a barrel, whereby a water-based ballpoint pen A is manufactured.

Manufacture of Water-Based Ballpoint Pen B

After each of the above-described ink composition is filled in a ballpoint pen refill having, fitted at one end of a polypropylene pipe (inner diameter: 3.8 mm), a tip made of a stainless steel which holds therein a ball having a diameter of 0.25 mm and the above-described ink follower is disposed at the rear portion of the refill, the ballpoint pen refill is inserted in a barrel, whereby a water-based ballpoint pen B is manufactured.

The above-described water-based ballpoint pens A and B were subjected to the following test.

Writing Test:

Writing is performed using an automatic writing tester and the state of drawn lines and whether the ink is consumed completely or not are studied.

The writing test is conducted using an automatic writing tester under the following conditions of writing speed of 4 m/min, writing load of 100 g and writing angle of 70°.

Results of the writing test will be shown in table 4.

The test results are evaluated in accordance with the following criteria:

A: The ink composition is consumed completely.

B: Blur is observed from a drawn line.

C: The ink composition is not consumed completely because of a failure in writing during the test.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

TABLE 1

| | Raw material | | Membrane filter | |
|---|---|---|---|---|
| | Trade name | Maker | 5 μm | 1 μm |
| Shear-thinning tackifier (xanthan gum) | KELZAN T | Sansho Co., Ltd. | A | A |
| | KELZAN ST | Sansho Co., Ltd. | A | A |
| | KELZAN ASX | Sansho Co., Ltd. | A | A |
| | ECHO GUM RD | Dainippon Pharmaceutical Co., Ltd. | A | A |
| | ECHO GUM BT | Dainippon Pharmaceutical Co., Ltd. | A | A |
| | RHABALL GUM EX | Dainippon Pharmaceutical Co., Ltd. | A | A |
| | ULTRAXANTHAN V7-T | Ina Food Industry Co., Ltd. | A | A |
| | NEWGELIN GXR | Chuo Kasei Co., Ltd. | A | A |
| | NEWGELIN GXT | Chuo Kasei Co., Ltd. | A | A |
| | K9A48 | Sansho Co., Ltd. | A | B |
| | KELZAN ASXT | Sansho Co., Ltd. | A | B |
| | KELZAN | Sansho Co., Ltd. | B | C |
| | KELZAN S | Sansho Co., Ltd. | C | C |
| | KELZAN AR | Sansho Co., Ltd. | C | C |
| | KELZAN HP | Sansho Co., Ltd. | C | C |
| | MONATE GUM DA | Dainippon Pharmaceutical Co., Ltd. | A | C |
| | XANTHAN GUM G | Dainippon Pharmaceutical Co., Ltd. | C | C |
| | ECHO GUM | Dainippon Pharmaceutical Co., Ltd. | C | C |
| | ECHO GUM GM | Dainippon Pharmaceutical Co., Ltd. | C | C |
| | ECHO GUM F | Dainippon Pharmaceutical Co., Ltd. | C | C |
| | ECHO GUM SF | Dainippon Pharmaceutical Co., Ltd. | C | C |
| | ULTRAXANTHAN V7 | Ina Food Industry Co., Ltd. | C | C |
| Shear-thinning tackifier (others) | RHEOZAN | Sansho Co., Ltd. | B | C |
| | WELAN GUM | Sansho Co., Ltd. | C | C |
| | ALCASEA GUM | Hakuto Co., Ltd. | C | C |
| | ALCASEALAN | Hakuto Co., Ltd. | C | C |

TABLE 2

| | | Example | | | | |
|---|---|---|---|---|---|---|
| Raw material | Note | 1 | 2 | 3 | 4 | 5 |
| Black dye dispersion | (1) | 40.0 | | | | |
| Red dye | (2) | | 5.0 | | | |
| Blue dye | (3) | | | 6.0 | | |
| Black pigment dispersion | (4) | | | | 50.0 | |
| Blue pigment dispersion | (5) | | | | | 45.0 |
| Xanthan gum A | (6) | 0.5 | | | | |
| Xanthan gum B | (7) | | 0.38 | | | |
| Xanthan gum C | (8) | | | 0.4 | | |
| Xanthan gum D | (9) | | | | 0.3 | |
| Xanthan gum E | (10) | | | | | 0.35 |
| Rust preventive | (11) | 0.3 | 0.3 | 0.3 | 0.3 | 0.3 |
| Lubricant | (12) | 0.5 | 0.5 | 0.5 | 0.5 | 0.5 |
| Triethanolamine | | 1.0 | 1.0 | 1.0 | 1.0 | 1.0 |
| Diethylene glycol | | 10.0 | | 20.0 | | |
| Glycerin | | 10.0 | 30.0 | | 20.0 | 20.0 |
| Water | | 37.7 | 62.82 | 71.8 | 27.9 | 32.85 |

TABLE 3

| | | Comparative Example | | | | |
|---|---|---|---|---|---|---|
| Raw material | Note | 1 | 2 | 3 | 4 | 5 |
| Black dye dispersion | (1) | 40.0 | | | | |
| Red dye | (2) | | 5.0 | | | |
| Blue dye | (3) | | | 6.0 | | |
| Black pigment dispersion | (4) | | | | 50.0 | |
| Blue pigment dispersion | (5) | | | | | 45.0 |
| Xanthan gum F | (13) | 0.5 | | | | |
| Welan gum | (14) | | 0.38 | | | |
| Polysaccharide A | (15) | | | 0.4 | | |
| Xanthan gum G | (16) | | | | 0.3 | |
| Xanthan gum H | (17) | | | | | 0.35 |
| Rust preventive | (11) | 0.3 | 0.3 | 0.3 | 0.3 | 0.3 |
| Lubricant | (12) | 0.5 | 0.5 | 0.5 | 0.5 | 0.5 |

TABLE 3-continued

| | | Comparative Example | | | | |
|---|---|---|---|---|---|---|
| Raw material | Note | 1 | 2 | 3 | 4 | 5 |
| Triethanolamine | | 1.0 | 1.0 | 1.0 | 1.0 | 1.0 |
| Diethylene glycol | | 10.0 | | 20.0 | | |
| Glycerin | | 10.0 | 30.0 | | 20.0 | 20.0 |
| Water | | 37.7 | 62.82 | 71.8 | 27.9 | 32.85 |

TABLE 4

| | Complete ink consumption for writing (ball diameter: 0.5 mm) | Complete ink consumption for writing (ball diameter: 0.25 mm) |
|---|---|---|
| Example 1 | A | A |
| Example 2 | A | A |
| Example 3 | A | A |
| Example 4 | A | A |
| Example 5 | A | A |
| Comparative Example 1 | A | C |
| Comparative Example 2 | B | B |
| Comparative Example 3 | B | C |
| Comparative Example 4 | A | C |
| Comparative Example 5 | A | C |

What is claimed is:

1. A water-based ink composition for a ballpoint pen, comprising:
   a colorant;
   water;
   a water soluble organic solvent; and
   a shear-thinning tackifier including at least a polysaccharide, wherein an average particle size of the polysaccharide is less than 5 μm.

2. The water-based ink composition according to claim 1, wherein the average particle size of the polysaccharide is less than 3 μm.

3. The water-based ink composition according to claim 1, wherein the polysaccharide is xanthan gum or succinoglycan.

4. A water-based ballpoint pen, comprising:
the water-based ink composition according to claim 1;
a ball;
a ballpoint pen tip having a ball holding portion which holds the ball rotatably at an apex thereof;
an ink reservoir tube connected directly or via a connecting member to the ball point pen tip, the ink reservoir tube including:
a ballpoint pen refill directly filled with the ink; and
a barrel accommodating the ballpoint pen refill therein,
wherein a movable distance of the ball in the ball holding portion in an axial direction is 3 μm or more and 15 μm or less.

5. The water-based ballpoint pen according to claim 4, further comprising a cap.

6. The water-based ballpoint pen according to claim 4, wherein the ballpoint pen tip is formed such that a ball receiving seat is formed by pressing and deforming a vicinity of an end of a metal pipe inwardly from an outer surface thereof.

7. The water-based ballpoint pen according to claim 4, wherein a diameter of the ball is 0.1 mm or more and less than 0.3 mm.

8. The water-based ballpoint pen according to claim 4, wherein an ink follower is disposed at a rear end surface of the water-based ink composition.

9. The water-based ballpoint pen according to claim 4, wherein a movable distance of the ball in the ball holding portion in the axial direction is 3 μm or more and 13 μm or less.

10. The water-based ballpoint pen according to claim 4, wherein a movable distance of the ball in the ball holding portion in the axial direction is 4 μm or more and 11 μm or less.

11. The water-based ballpoint pen according to claim 4, wherein a movable distance of the ball in the ball holding portion in a radial direction is 3 μm or more and 20 μm or less.

12. The water-based ballpoint pen according to claim 4, wherein the ball is made of one selected from hard metal, stainless steel, ruby, ceramic, resin and rubber.

13. A water-based ballpoint pen, comprising:
the water-based ink composition according to claim 1 filled in the ballpoint pen;
a ball;
a ballpoint pen tip having a ball holding portion which holds the ball rotatably at an apex thereof; and
an barrel connected directly or via a connecting member to the ball point pen tip,
wherein a movable distance of the ball in the ball holding portion in an axial direction is 3 μm or more and 15 μm or less.

14. A cap-less type water-based ballpoint pen, comprising:
the water-based ink composition according to claim 1;
a ball;
a ballpoint pen tip holding the ball rotatably at an apex thereof;
an ink reservoir tube connected directly or via a relay member to the ball point pen tip, the ink reservoir tube including;
a ballpoint pen refill directly filled with the water-based ink composition;
a barrel accommodating the ballpoint pen refill therein; and
a retractable mechanism which actuates a writing tip portion of the ballpoint pen refill to protrude or retract from a front-end opening portion of the barrel.

15. The water-based ink composition according to claim 1, further comprising at least one of humectants, pH regulator, rust preventive agent, antiseptic agent, mildew proofing agent, lubricant and defoaming agent.

16. The water-based ink composition according to claim 1, wherein the average particle size of the polysaccharide is less than 1 μm.

* * * * *